US010531419B2

(12) United States Patent
Kunz et al.

(10) Patent No.: US 10,531,419 B2
(45) Date of Patent: Jan. 7, 2020

(54) COMMUNICATION SYSTEM FOR PROVIDING IP MULTIMEDIA SUBSYSTEM CENTRALIZED SERVICES

(71) Applicant: NEC CORPORATION, Tokyo (JP)

(72) Inventors: Andreas Kunz, Heidelberg (DE); Genadi Velev, Heidelberg (DE); Filipe Leitao, Heidelberg (DE); Anand Raghawa Prasad, Tokyo (JP); Naoaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/755,815

(22) PCT Filed: Nov. 9, 2016

(86) PCT No.: PCT/JP2016/004848
§ 371 (c)(1),
(2) Date: Feb. 27, 2018

(87) PCT Pub. No.: WO2017/081869
PCT Pub. Date: May 18, 2017

(65) Prior Publication Data
US 2018/0332555 A1    Nov. 15, 2018

(30) Foreign Application Priority Data
Nov. 10, 2015  (EP) .................................. 15193970

(51) Int. Cl.
*H04W 60/04*    (2009.01)
*H04W 8/12*    (2009.01)
(Continued)

(52) U.S. Cl.
CPC ......... *H04W 60/04* (2013.01); *H04L 65/1016* (2013.01); *H04L 65/1073* (2013.01);
(Continued)

(58) Field of Classification Search
CPC ........ H04W 60/04; H04W 8/08; H04W 8/20; H04W 12/06; H04L 65/1016
See application file for complete search history.

(56) References Cited

U.S. PATENT DOCUMENTS 6,038,445 A * 3/2000 Alperovich ............. H04W 8/12
455/432.1
9,749,904 B1 * 8/2017 Zhang ............... H04W 36/0022
(Continued)

FOREIGN PATENT DOCUMENTS

WO    WO 2007/045264    4/2007
WO    WO 2008/104225    9/2008

OTHER PUBLICATIONS

International Search Report dated Jan. 17, 2017, in corresponding PCT International Application.
(Continued)

*Primary Examiner* — Brandon J Miller
(74) *Attorney, Agent, or Firm* — Finnegan, Henderson, Farabow, Garrett & Dunner, L.L.P.

(57) ABSTRACT

This invention provides a network node for IP Multimedia Subsystem (IMS) Centralized Services (ICS), comprising: a memory storing instructions; and at least one processor configured to process the instructions to: receive an Update Location Request with an IMSI (International Mobility Subscriber Identity) and an MSRN (Mobile Station Routing Number) from a MSC (Mobile Switching Centre) Server, retrieve a subscription profile and service settings from a HSS (Home Subscriber Server), map the subscription profile with service settings into a CS (Circuit-Switched) profile with CS settings, and send an Insert Subscriber Data message including the mapped CS profile and CS settings, to the MSC Server.

11 Claims, 10 Drawing Sheets

(51) Int. Cl.
   *H04L 29/06*   (2006.01)
   *H04W 8/08*   (2009.01)
   *H04W 8/20*   (2009.01)
   *H04W 12/06*   (2009.01)
   *H04W 60/00*   (2009.01)

(52) U.S. Cl.
   CPC ............... *H04W 8/08* (2013.01); *H04W 8/12* (2013.01); *H04W 8/20* (2013.01); *H04W 12/06* (2013.01); *H04W 60/00* (2013.01)

(56) References Cited

U.S. PATENT DOCUMENTS

| | | | | |
|---|---|---|---|---|
| 2001/0031635 | A1* | 10/2001 | Bharatia | H04W 12/08 455/432.1 |
| 2004/0015692 | A1* | 1/2004 | Green | H04L 63/0823 713/169 |
| 2005/0149734 | A1* | 7/2005 | Eronen | H04L 9/002 713/176 |
| 2010/0130159 | A1* | 5/2010 | Wu | H04M 3/229 455/404.1 |
| 2011/0117910 | A1* | 5/2011 | Bae | H04W 12/06 455/433 |
| 2011/0188446 | A1 | 8/2011 | Bienas et al. | |
| 2011/0249661 | A1* | 10/2011 | Bae | H04L 12/6418 370/338 |

OTHER PUBLICATIONS

"3$^{rd}$ Generation Partnership Project; Technical Specification Group Services and System Aspects; IP Multimedia Subsystem (IMS), Stage 2, (Release 13)", 3GPP TS 23.228, V13.1.0, pp. 1-314, (2015).
Rosenberg et al.; "SIP: Session Initiation Protocol", RFC 3261 by Internet Engineering Task Force (IETF), pp. 1-269 (2002).
"3$^{rd}$ Generation Partnership Project; Technical Specification Group Services and System Aspects; General Packet Radio Service (GPRS); Service Description, Stage 2, (Release 13)", 3GPP TS 23.060, V13.4.0, pp. 1-361, (2015).
"3$^{rd}$ Generation Partnership Project; Technical Specification Group Services and System Aspects; IP Multimedia Subsystem (IMS) Centralized Services, Stage 2, (Release 13)", 3GPP TS 23.292, V13.2.0, pp. 1-120, (2015).
"IMS Service Centralization and Continuity Guidelines", GSMA IR.64, V12.0, pp. 1-23, (2015).
3GPP TSG SA WG2 Meeting #105 S2-143750, 5 sheets, (2014).
3GPP TSG SA WG2 Meeting #111, S2-153652, 3 sheets, (2015).
3GPP Draft SA WG2 Meeting #113, S2-160864, 5 sheets, (2016).

* cited by examiner

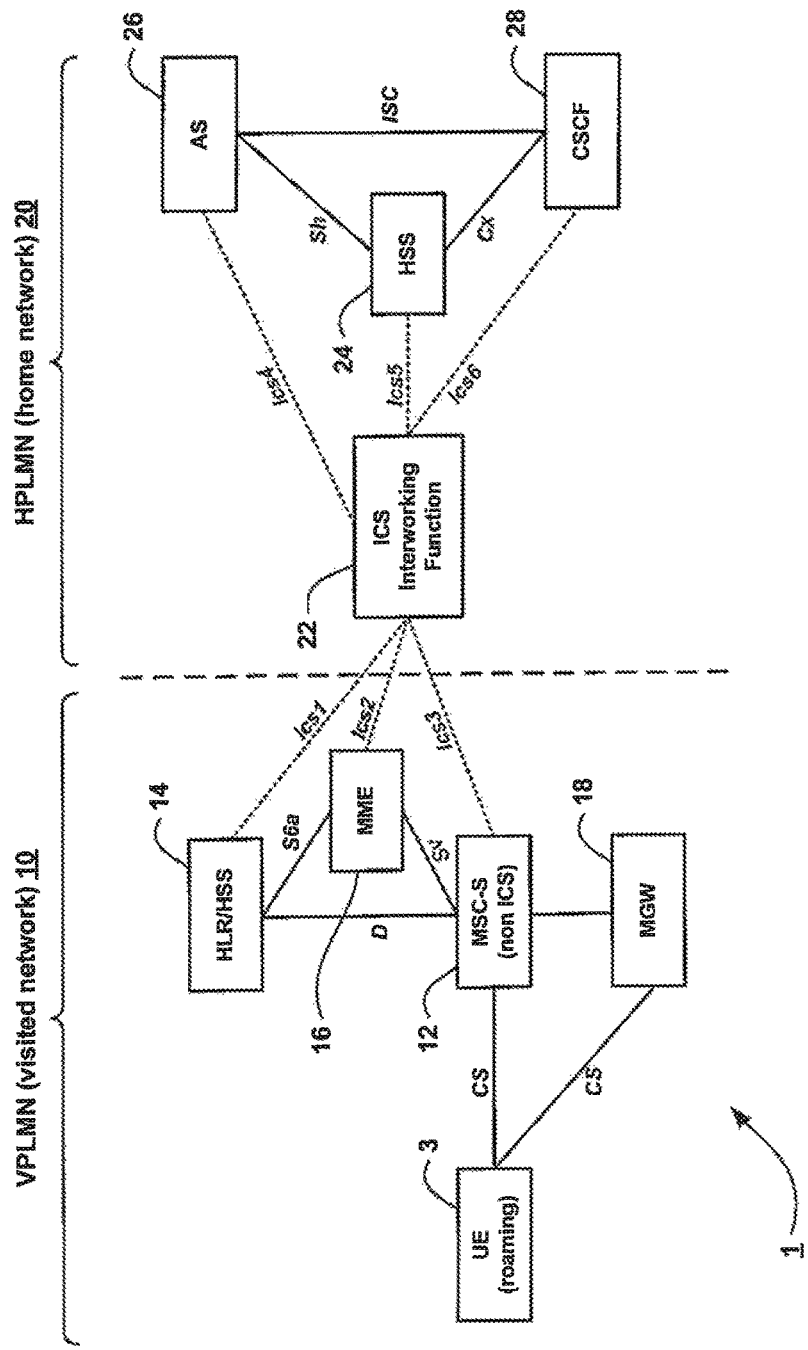
[Fig. 1]

[Fig. 2]
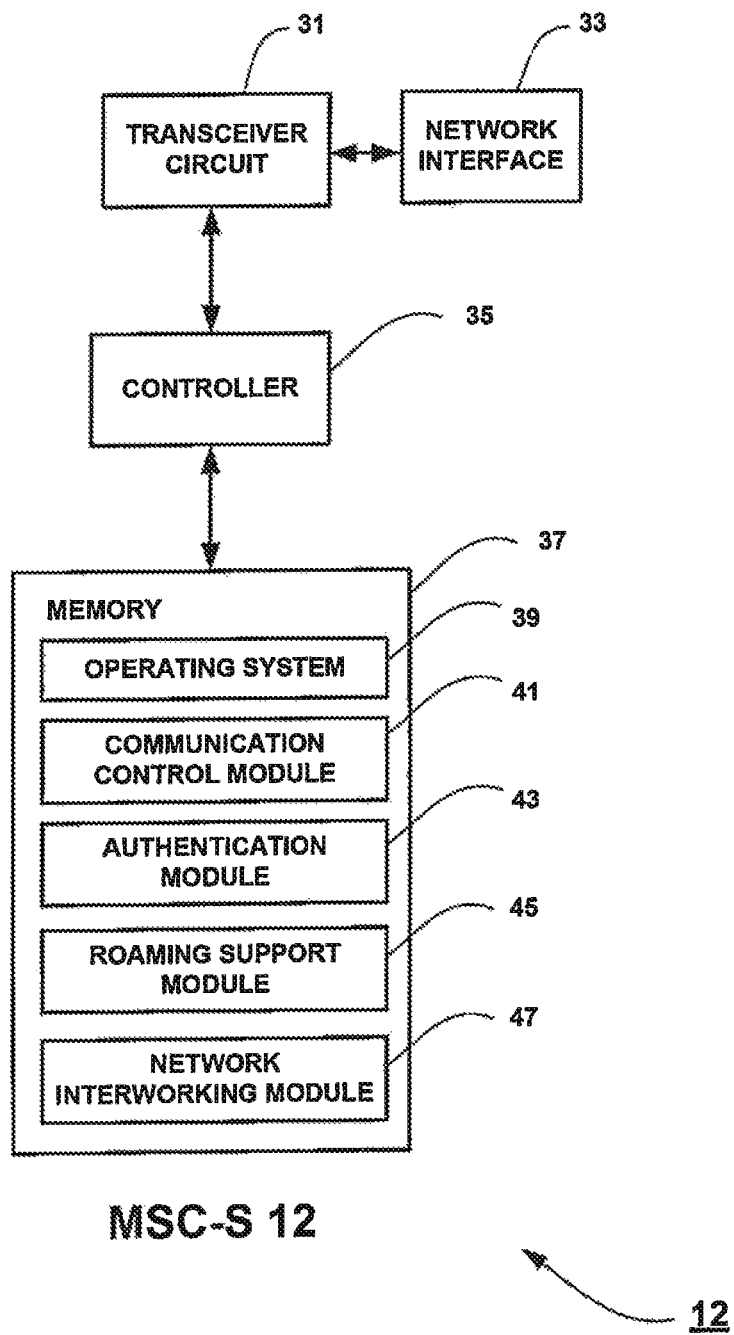

[Fig. 3]
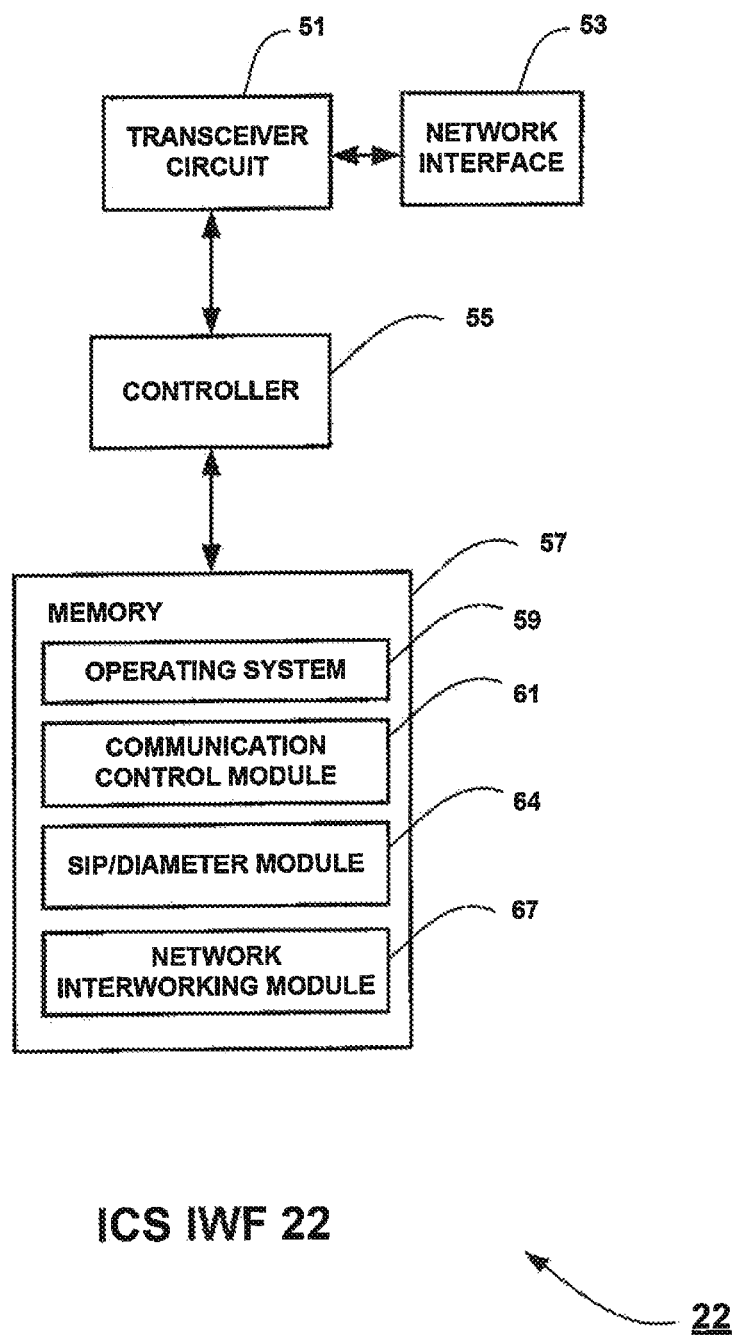

[Fig. 4]
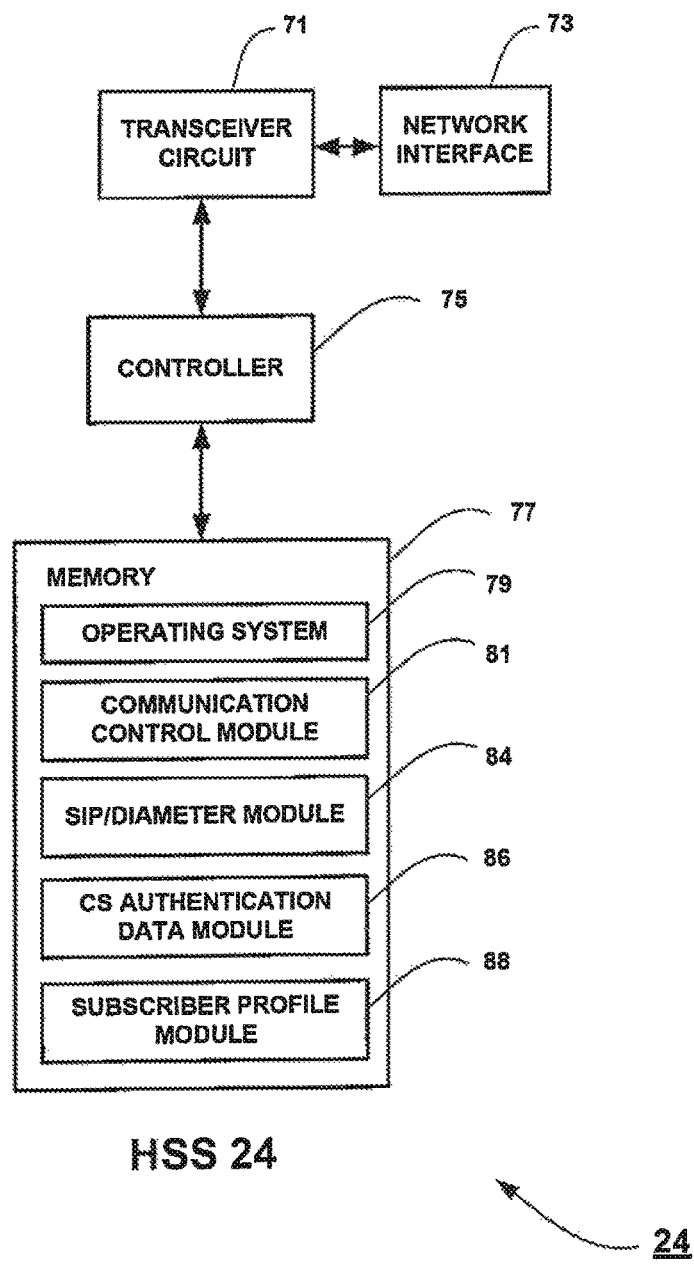

[Fig. 5]
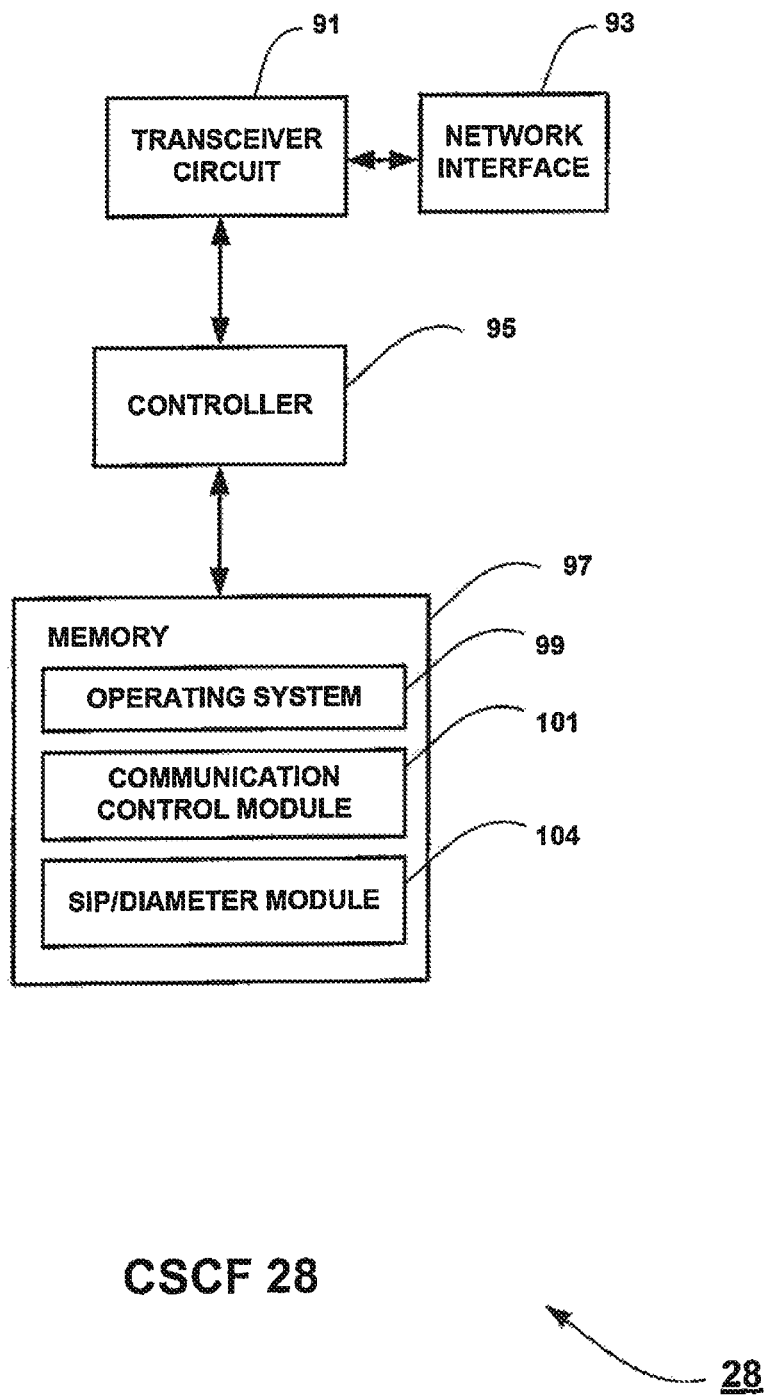

[Fig. 6]
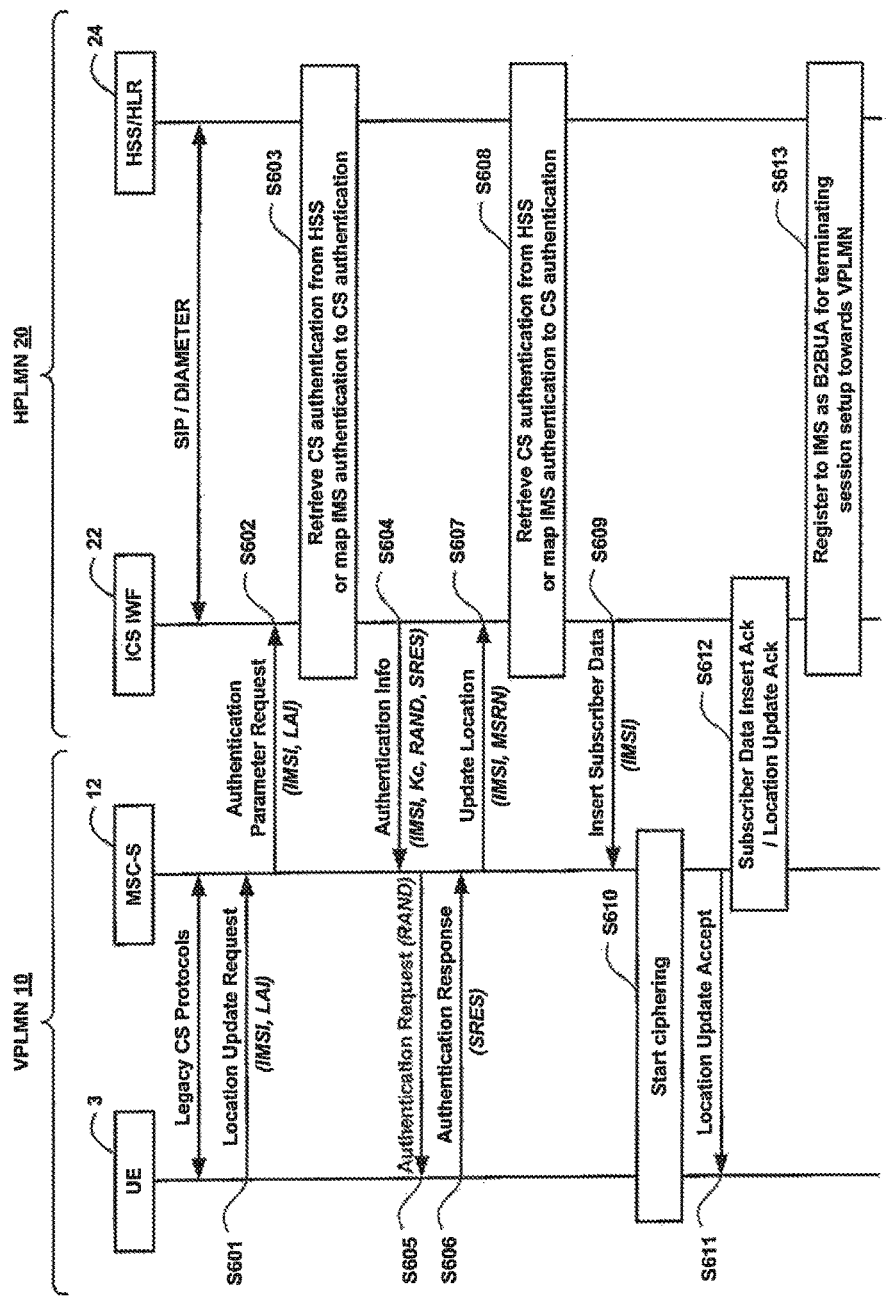

[Fig. 7]
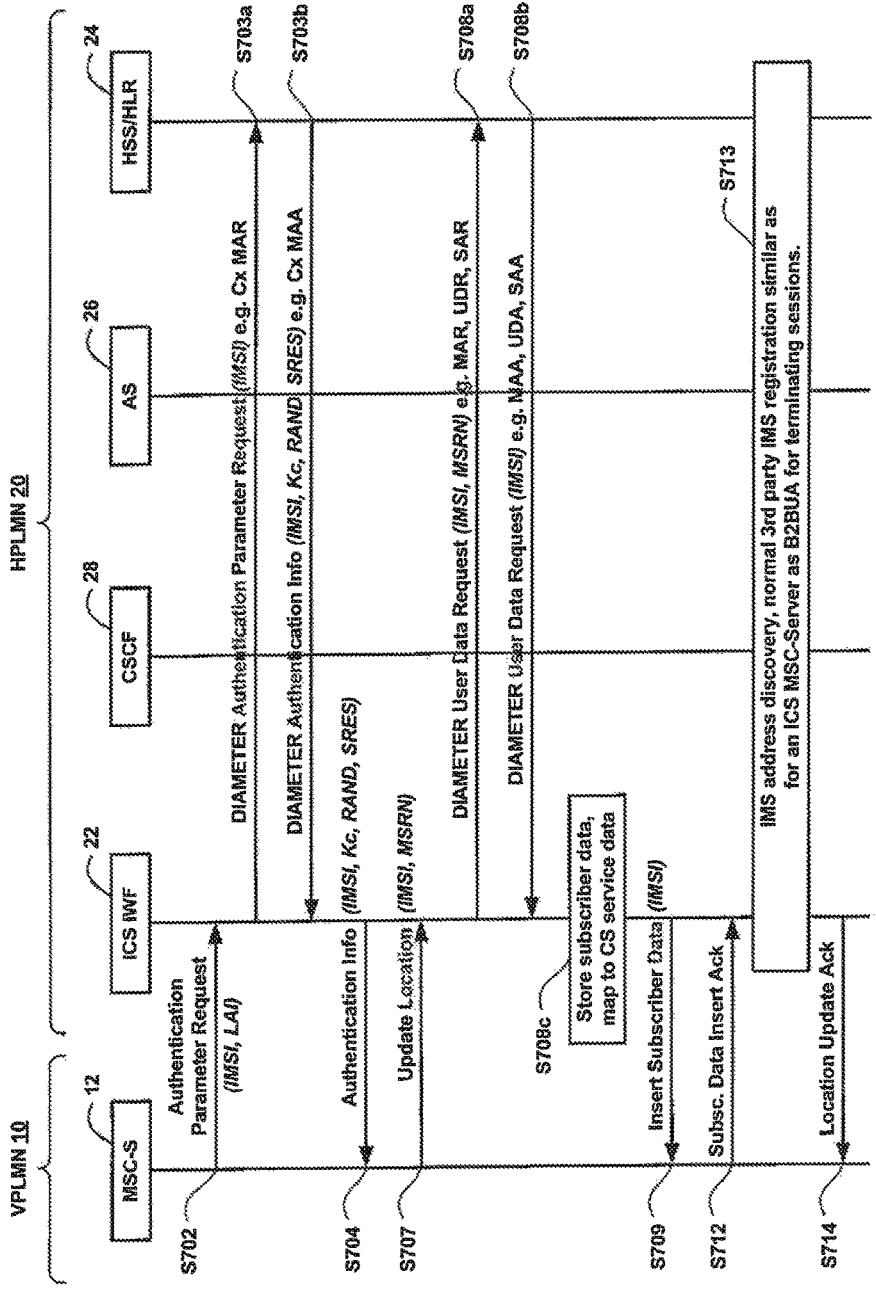

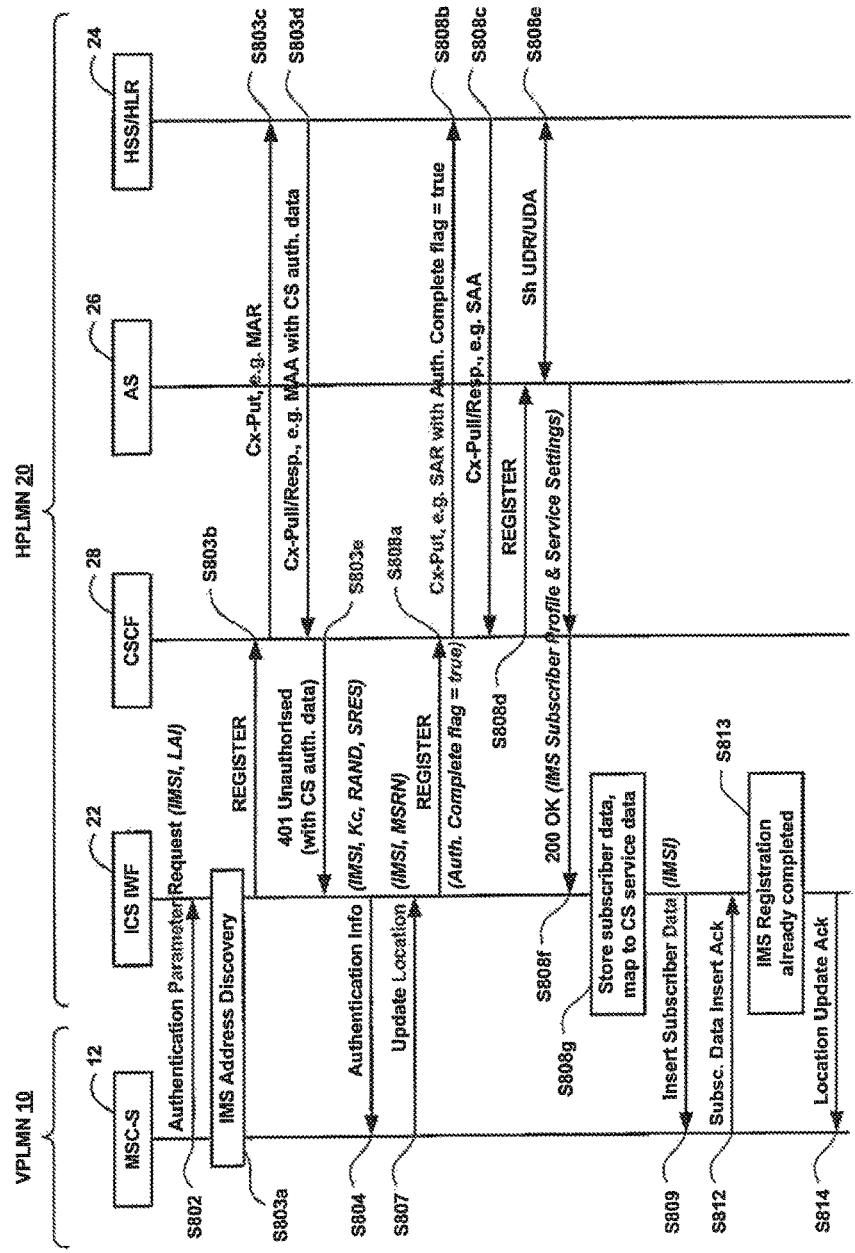
[Fig. 8]

[Fig. 9]
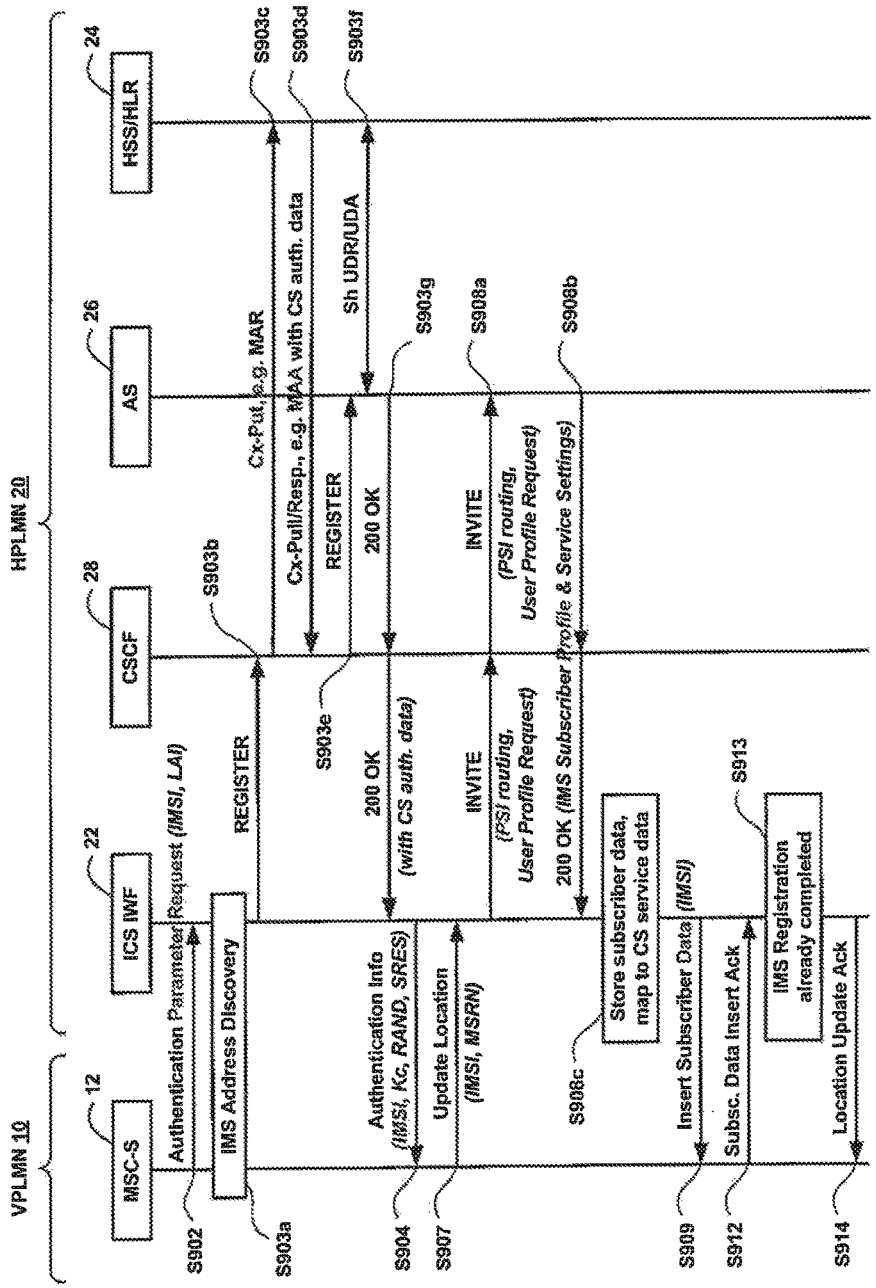

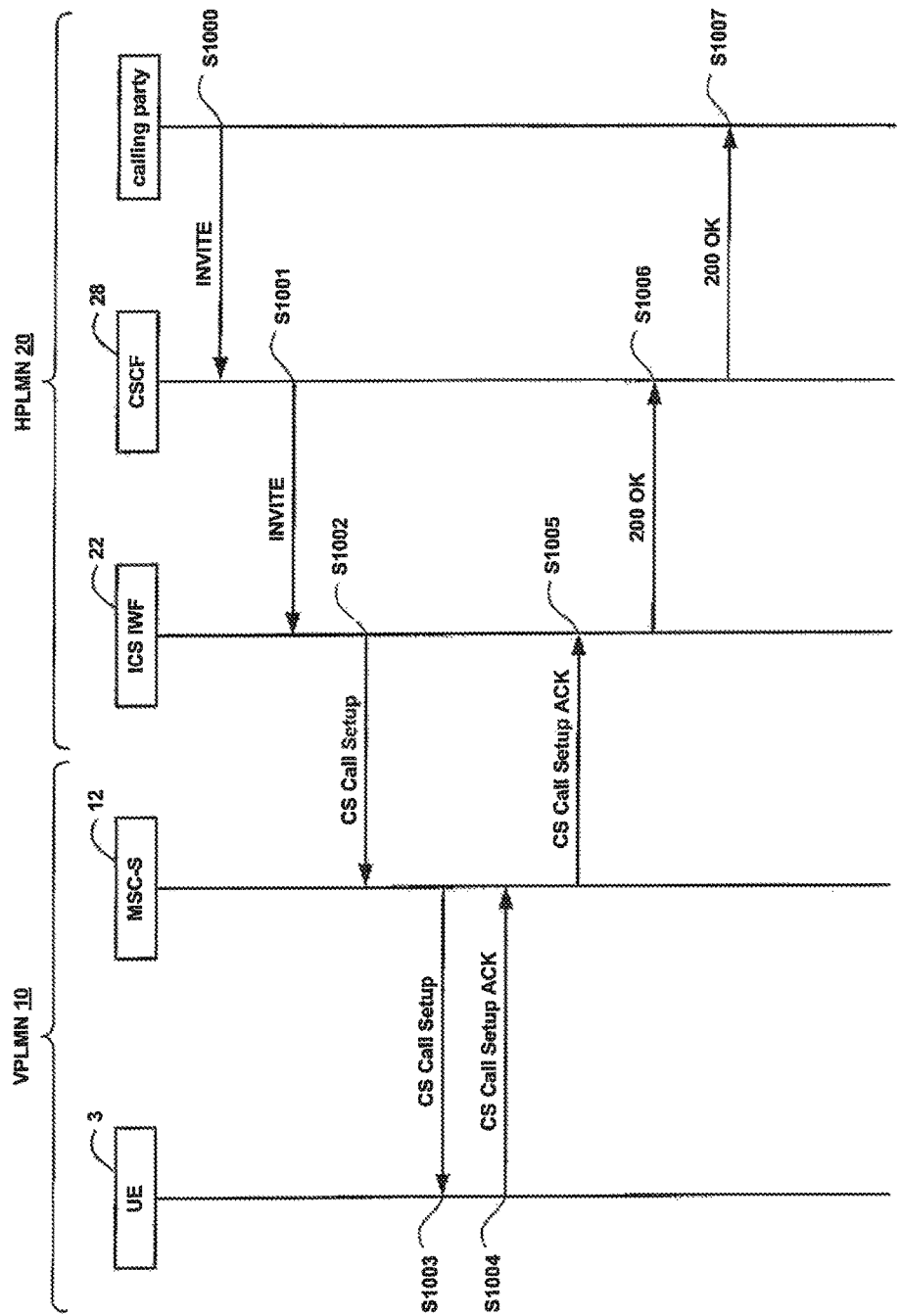
[Fig. 10]

COMMUNICATION SYSTEM FOR PROVIDING IP MULTIMEDIA SUBSYSTEM CENTRALIZED SERVICES

CROSS-REFERENCE TO RELATED PATENT APPLICATIONS

This application is a National Stage Entry of International Application No. PCT/JP2016/004848, filed Nov. 9, 2016, which claims priority from Japanese Patent Application No. 15193970.9, filed Nov. 10, 2015. The entire contents of the above-referenced applications are expressly incorporated herein by reference.

TECHNICAL FIELD

The present invention relates to mobile communication devices and networks, particularly but not exclusively those operating according to the 3rd Generation Partnership Project (3GPP) standards or equivalents or derivatives thereof, such as the Long Term Evolution (LTE) of the Evolved Packet Core (EPC) network. The invention has particular although not exclusive relevance to the provision of outbound roamer support into a visited network that does not support the Internet Protocol (IP) Multimedia Subsystem (IMS) and/or IMS Centralized Services (ICS) supported by the roaming subscriber's home network.

BACKGROUND ART

In a mobile (cellular) communications network, (user) communication devices (also known as user equipment (UE), for example mobile telephones) communicate with remote servers or with other communication devices via base stations. The type of connections that such user equipment may have with the network include: circuit switched (CS) connections, mainly used for voice calls and/or the like; and packet switched (PS) connections, for communicating data packets (e.g. IP packets). Each base station is connected to a core network (such as an IMS or an EPC network), which is in turn connected to other networks for providing end-to-end connectivity for the users.

3GPP specified the IP Multimedia Core Network Subsystem—often referred to as the IP Multimedia Subsystem (IMS)—for enabling IP-based multimedia services for user equipment. A so-called Proxy Call Session Protocol Function (P-CSCE) of an IMS is responsible for exchanging Session Initiation Protocol (SIP) signalling with UEs connected to the IMS. The P-CSCF stores respective UE security and IP session parameters for each connected UE in order to facilitate appropriate encryption of SIP signalling exchanged between a particular UE and the P-CSCF. The P-CSCF is also responsible for authorising the resources necessary for the IP session for each UE and for forwarding messages to and from a next hop CSCF that is appropriate for a particular UE (determined during the registration process performed for that UE).

IMS is specified in 3GPP Technical Specification (TS) 23.228 V13.4.0 and the Session Initiation Protocol (V2.0) is specified in RFC 3261 by the Internet Engineering Task Force (IETF), the contents of which documents are incorporated herein by reference.

IMS Centralized Services (ICS) was specified in 3GPP from Release 8 onwards in several specifications. There are two basic approaches in order to execute supplementary services in IMS for user equipment (UE) that is still using a legacy circuit switched (CS) access towards its Mobile Switching Centre (MSC). One approach is based on enhancements to the MSC, i.e. by making the MSC able to act as a SIP User Agent on behalf of the UE. The other, less preferred approach requires enhancing the operation of the UE in order to make it capable to interact with the Application Server (AS) directly (i.e. without requiring support from the MSC and/or the IMS).

Current solutions include variations of different levels of support of IMS and ICS features in the network (in combination with other networks, if appropriate). One of the more popular options is the so-called MSC-Server (or 'MSC-S') that allows Operators to move away from the legacy CS network towards IMS and thus be able to offer IMS services even to legacy UE subscribers. Effectively, the MSC-S is a core network element which controls call switching and mobility management functions for mobile phones roaming in a network of base stations. The MSC-S can also be referred to as an 'MSC Server', an 'MSS', or an 'MTS-U'.

When a UE is connected to an (ICS capable) MSC-S using legacy CS protocols, the MSC-S connects to the appropriate IMS entities, e.g. an Application Server (AS) and a CSCF, for handling SIP signalling for the UE. The MSC-S also connects to a Media Gateway for transcoding the CS codecs used by the UE into appropriate IMS codecs. If the UE is a roaming UE, then the MSC-S in the visited network also contacts the home location register (HLR) of the home network in order to download the subscription profile into the visited location register (VLR). Further details on the ICS may be found in: 3GPP TS 23.060 V13.4.0; 3GPP TS 23.228 V13.4.0; 3GPP TS 23.292 V13.2.0; and GSMA IR.64 V12.0, the contents of which documents are incorporated herein by reference.

CITATION LIST

Non Patent Literature

[NPL 1]
3GPP TS 23.060, General Packet Radio Service (GPRS); Service description; Stage 2, v13.4.0, 2015 Sept. 22
[NPL 2]
3GPP TS 23.228, IP Multimedia Subsystem (IMS); Stage 2, v13.4.0, 2015 Sept. 22 [NPL 3]
3GPP TS 23.292, IP Multimedia Subsystem (IMS) centralized services; Stage 2, v13.2.0, 2015 Jun. 21
[NPL 4]
GSMA IR.64, IMS Service Centralization and Continuity Guidelines, V12.0, 2015 Sept. 15
[NPL 5]
3GPP Tdoc: S2-143750, New Work Item Description on Service Domain Centralization, October 2014
[NPL 6]
3GPP Tdoc: S2-153652, New Work Item Description on Service Domain Centralization, October 2015

SUMMARY OF INVENTION

Technical Problem

However, some operators would like to remove CS components from their core network completely and/ or move support for legacy CS interactions to the edge of their network. This need is mentioned in, for example, 3GPP Tdocs no. S2-143750 and S2-153652 (both titled "New Work Item Description on Service Domain Centralization"), although this need hasn't been addressed in 3GPP standards yet.

The inventors have realised that, in the absence of CS components and/or support for legacy CS interactions, network operators may be unable to offer outbound roaming services for their subscribers via other networks that do not have an IMS and/or does not support ICS. In other words, there is an issue as to how to offer outbound roaming services in a visited network which does not support any ICS/IMS, nor has IMS subscriptions nor has any service level agreement on IMS with the home network, while the home network only supports ICS/IMS.

Accordingly, preferred embodiments of the present invention aim to provide methods and apparatus which overcome or at least partially alleviate the above issues.

Solution to Problem

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

FIG. 1 illustrates a mobile (cellular) telecommunication system of a type to which example embodiments of the invention are applicable;

FIG. 2 is an exemplary block diagram illustrating the main functionalities of an MSC-S of the system shown in FIG. 1;

FIG. 3 is an exemplary block diagram illustrating the main functionalities of an ICS IWF of the system shown in FIG. 1;

FIG. 4 is an exemplary block diagram illustrating the main functionalities of an HSS of the system shown in FIG. 1;

FIG. 5 is an exemplary block diagram illustrating the main functionalities of a CSCF of the system shown in FIG. 1;

FIG. 6 is an exemplary timing diagram illustrating a method performed by components of the mobile telecommunication system of FIG. 1 whilst carrying out example embodiments of the invention;

FIG. 7 is another exemplary timing diagram illustrating a method performed by components of the mobile telecommunication system of FIG. 1 whilst carrying out example embodiments of the invention;

FIG. 8 is yet another exemplary timing diagram illustrating a method performed by components of the mobile telecommunication system of FIG. 1 whilst carrying out example embodiments of the invention;

FIG. 9 is a modification of the timing diagram shown in FIG. 8; and

FIG. 10 illustrates call flow for setting up a terminating call towards the visited network (for a roaming mobile device).

DESCRIPTION OF EMBODIMENTS

<Overview>

FIG. 1 schematically illustrates a mobile (cellular) telecommunication network 1 in which users of mobile devices (such as UE 3) can communicate with each other and other users via base stations and a core network using an appropriate radio access technology (RAT), e.g. E-UTRA and/or the like. As those skilled in the art will appreciate, whilst one mobile device 3 is shown in FIG. 1 for illustration purposes, the system, when implemented, will typically include other mobile devices.

As can be seen the network 1 includes a visited public land mobile network (VPLMN) 10 part in which the mobile device 3 is currently roaming and a home public land mobile network (HPLMN) 20 part to which the mobile device 3 is a subscriber. In the following, the HPLMN part is simply referred to as the home network 20 and the VPLMN part is referred to as the visited network 10 (of the mobile device 3).

In this example, the home network 20 supports ICS and/or IMS only (and hence the mobile device 3 is expected to communicate with its home network 20 using ICS and/or IMS technologies, e.g. using a circuit switched (CS) connection). However, it will also be appreciated that the mobile device 3 may comprise an IMS (LTE) UE which is capable of other than ICS and/or IMS technologies and employs a CS connection because of the capabilities of its home network 20.

The visited network 10 in this example does not support the ICS and/or IMS supported by the home network 20. For example, the visited network 10 may support an LTE core network, which may also be referred to as the enhanced packet core (EPC) network. However, it will be appreciated that the visited network 10 may comprise any non-ICS or non-IMS network, if appropriate.

The VPLMN actually is considered here only from the CS core network perspective (MSC Server with MGW, HLR). The VPLMN may have GPRS/LTE core network but it is not required for the invention. From that point of view the core network type in the VPLMN is left open. The MME is only mentioned in the case of combined attach/location update, when the request comes from the MME.

Accordingly, the visited network 10 includes, amongst others, one or more base stations (referred to as 'eNBs' in LTE—not shown in FIG. 1), a mobile switching centre server (MSC-S) 12, a home location register (HLR)/home subscriber server (HSS) 14, a mobility management entity (MME) 16, and a media gateway (MGW) 18. As shown, the nodes of the visited network 10 are coupled to each other using appropriate (standard) interfaces. The mobile device 3 and its serving base station are connected via an appropriate air interface (e.g. an LTE air interface, such as the "Uu" interface), and thus the mobile device 3 is connected to the MSC-S 12 using a circuit switched (CS) connection (via the serving base station). The mobile device 3 is thus able to connect to other nodes of the visited network 10 via its serving base station and the MSC-S 12.

The home network 20 includes, amongst others, an ICS interworking function (ICS IWF) 22, an HSS 24, an application server (AS) 26, and a CSCF 28, The home network nodes are also connected to each other using appropriate (standard) interfaces, as shown.

The MSC-S 12 is responsible for managing call setup and mobility (in the visited network 10) for mobile devices served by base stations connected to this MSC-S 12. The MSC-S 12 interfaces with the AS 26 and the CSCF 28 for conveying SIP signalling between the mobile device 3 and the AS 26 and/or the CSCF 28. Since the visited network 10 does not support ICS/IMS, the MSC-S 12 shown in FIG. 1 is labelled as a 'non ICS' node.

The HLR/HSS 14 is responsible for storing and managing subscriber data, e.g. subscription information/subscription profiles for subscribers of the visited network 10. Similarly, the HSS 24 is responsible for storing and managing subscriber data for subscribers of the home network 20 (in this example, the mobile device 3). Beneficially, since the home network 20 includes the ICS IWF 22 (which will be described in detail later), there is no need to implement a home location register functionality is the home network 20.

As is well known, a mobile device 3 may enter and leave the areas(i.e. radio cells) served by the various base stations as the mobile device 3 is moving around in the geographical area covered by the telecommunication network 1. The MME 16 is responsible for keeping track of the mobile device 3 and for facilitating movement of the mobile device 3 between the different base stations.

The MGW 18 is responsible for transcoding between the codecs (if different) used by the mobile device 3 and a remote endpoint in communication with the mobile device 3.

The ICS IFW 22 is responsible for interworking with nodes of other networks, such as the MSC-S 12, in order to facilitate roaming for subscribers of the home network 20 (in this example, the mobile device 3) into other networks (in this example, the visited network 10). Beneficially, the ICS IFW 22 acts as a HLR of the home network 20 towards the visited network 10 and handles CS authentication and/or third party registration related messages for granting the mobile device 3 access to the visited network 10 in a protocol independent manner.

The AS 26 is responsible for end-to-end communications between (an appropriate application in) the mobile device 3 and a corresponding application hosted by the AS 26 (and/or a node connected to it). The CSCF 28 is a SIP server that implements IMS call session control functionality for the mobile device 3. The CSCF 28 may be configured as at least one of: a Proxy CSCF (P-CSCF); an Interrogating CSCF (I-CSCF); and a Serving CSCF (S-CSCF). The CSCF 28 also supports the DIAMETER protocol (denoted 'Cx' in FIG. 1) for communicating with the HSS 24. As those skilled in the art will appreciate, whilst one AS 26 and one CSCF 28 are shown in FIG. 1 for illustration purposes, the system, when implemented, will typically include other application servers and CSCFs.

In this system, beneficially, the ICS IWF 22 is configured to facilitate communication between nodes to the home network 20 and nodes of the visited network 10 so that the mobile device 3 is still able to use legacy CS protocols while roaming in the visited network 10. Specifically, the ICS IWF 22 is configured to grant outbound roaming user access to the visited network 10 regardless whether or not the visited network supports ICS.

This is made possible by coupling the ICS IWF 22 to some of the home network and visited network nodes via appropriate interfaces (denoted reference points 'Ics1' to 'Ics6' in FIG. 1). It will be appreciated that the reference points Ics1 to Ics6 may comprise existing reference points (e.g. an updated version of the I3, ISC, Cx, Mw, Sh, I2 reference points and/or the like) depending on the protocol of choice and the collocated functionality of the ICS IWF 22. It will also be appreciated that not all of the reference points Ics1 to Ics6 may be needed (hence they are shown in dashed lines in FIG. 1).

Thus, in this system, the mobile device 3 which belongs to an ICS enabled home network 20 is able to roam into the non-ICS capable visited network 10. In this example, registration to the visited network is initiated by the mobile device 3 sending a Location Update Request message to the MSC-S 12 and including in this message its associated International Mobile Subscriber Identifier (IMSI) and a Location Area Identifier (LAI) associated with the area (cell) where the mobile device 3 is currently located. Based on the IMSI, the MSC-S 12 determines that the mobile device 3 belongs to the home network 20 (i.e. the mobile device 3 is a roaming LIE). Therefore, the MSC-S 12 contacts the ICS IWF 22 (which is acting as the HLR of the home network 20) indicating that CS authentication is required for the mobile device 3. The MSC-S 12 also requests appropriate authentication parameters for the mobile device 3.

As there is no HLR functionality in the home network 20, the ICS IWF 22 is configured to retrieve a necessary CS authentication data from the HSS 24 (using, for example, DIAMETER or SIP signalling) and returns the appropriate authentication parameters to the MSC-S 12, Using the returned authentication parameters, the MSC-S 12 is able to trigger a CS authentication procedure for the mobile device 3. This procedure typically includes the MSC-S 12 sending a 'RAND' value (a random number received form the HSS 24 via the ICS IWF 22) to the mobile device 3 and the mobile device 3 computing and returning a corresponding signed response (SRES) to the MSC-S 12.

Once the CS authentication procedure is successful (i.e. when the MSC-S 12 determines that the mobile device 3 returned the correct SRES value for the RAND challenge), the MSC-S 12 sends an Update Location Request with the mobile device's 3 IMSI and Mobile Station Routing Number (MSRN) to the ICS IWF 22 (acting as the HLR of the home network 20).

The ICS IWF 22 retrieves the subscription profile and service settings from the HSS and maps them into a CS profile with CS settings. The ICS IWF 22 replies with the Insert Subscriber Data message according to normal VLR-HLR procedures. The MSC-S 12 starts ciphering according to normal procedures.

The MSC-S 12 exchanges the Subscriber Data Insert Acknowledgement and Location Update Acknowledgement according to normal VLR-HLR procedures.

If necessary, the ICS IWF 22 also performs a so-called 3rd party registration to the home network 20 in order to enable terminating session redirection for the mobile device 3 to the visited network 10.

Beneficially, in this example, it is sufficient to provide a legacy (non-ICS) MSC in the visited network without requiring any change to the protocols and/or procedures used in the visited network. Moreover, there is also no need to provide a legacy HLR in the (ICS) home network.

<Mobile Switching Centre Server>

FIG. 2 is a block diagram illustrating the main components of the MSC-S 12 shown in FIG. 1. As shown, the MSC-S 12 has a transceiver circuit 31, and a network interface 33 for transmitting signals to and for receiving signals from other network nodes (such as the UE 3 and the ICS IWF 22). The MSC-S 12 has a controller 35 to control the operation of the MSC-S 12. The controller 35 is associated with a memory 37.

Software may be pre-installed in the memory 37 and/or may be downloaded via the telecommunication network 1 or from a removable data storage device (RMD), for example. The controller 35 is configured to control the overall operation of the MSC-S 12 by, in this example, program instructions or software instructions stored within the memory 37. As shown, these software instructions include, among other things, an operating system 39, a communication control module 41, an authentication module 43, a roaming support module 45, and a network interworking module 47.

The communication control module 41 controls the communication between the MSC-S 12 and other network entities that are connected to the MSC-S 12 (e.g. the UE 3, the HLR/HSS 14, the MME 16, the MGW 18, and the ICS IWF 22).

The authentication module 43 is responsible for authenticating mobile devices connected to this MSC-S 12 by generating, sending, and receiving appropriately formatted authentication challenges and responses, For example, for CS authentication purposes, the authentication module 43 is configured to send an appropriate RAND value to the mobile device 3 and to receive an SRES back from the mobile device 3 (and compare the received SRES with an SRES obtained from the mobile device's 3 HSS).

The roaming support module 45 is responsible for determining whether a particular mobile device 3 connected to this MSC-S 12 belongs to a difference network than the visited network 10.

The network interworking module 47 is responsible for handling (generating, sending, and receiving) signalling messages formatted in accordance with the protocol used over the interface (such as the 'Ics3' interface) with other networks (e.g. the home network 20). Such signalling messages may include, for example, messages and associated responses for registering and authenticating the mobile device 3 when it is roaming in the visited network 10.

<ICS Interworking Function>

FIG. 3 is a block diagram illustrating the main components of the ICS IWF 22 shown in FIG. 1. As shown, the ICS IWF 22 has a transceiver circuit 51, and a network interface 53 for transmitting signals to and for receiving signals from other network nodes (such as the MSC-S 12 and the HSS 24). The ICS IWF 22 has a controller 55 to control the operation of the ICS IWF 22. The controller 55 is associated with a memory 57.

Software may be pre-installed in the memory 57 and/or may be downloaded via The telecommunication network 1 or from a removable data storage device (RMD), for example. The controller 55 is configured to control the overall operation of the ICS IWF 22 by, in this example, program instructions or software instructions stored within the memory 57. As shown, these software instructions include, among other things, an operating system 59, a communication control module 61, a SIP/DIAMETER module 64, and a network interworking module 67.

The communication control module 61 controls the communication between the ICS IWF 22 and other network entities that are connected to the ICS IWF 22 (e.g. the MSC-S 12, the HSS 24, the application server(s) 26, and the CSCF(s) 28).

The SIP/DIAMETER module 64 is responsible for handling (generating, sending, and receiving) signalling messages formatted in accordance with the Session Initiation and/or the DIAMETER protocol (if applicable). Such SIP/DIAMETER messages may relate to retrieval, from the HSS 24, of CS authentication parameters/subscriber profile associated with the mobile device 3, and to performing third party registration of the mobile device 3 in the home network 20.

The network interworking module 67 is responsible for handling (generating, sending, and receiving) signalling messages formatted in accordance with the protocol used over the interface (such as the 'Ics3' interface) with other networks (e.g. the visited network 10). Such signalling messages may include, for example, messages and associated responses for registering and authenticating the mobile device 3 when it is roaming in the visited network 10.

<Home Subscriber Server>

FIG. 4 is a block diagram illustrating the main components of the HSS 24 shown in FIG. 1. As shown, the HSS 24 has a transceiver circuit 71, and a network interface 73 for transmitting signals to and for receiving signals from other network nodes (such as the ICS IWF 22). The HSS 24 has a controller 75 to control the operation of the HSS 24. The controller 75 is associated with a memory 77.

Software may be pre-installed in the memory 77 and/or may be downloaded via the telecommunication network 1 or from a removable data storage device (RMD), for example. The controller 75 is configured to control the overall operation of the HSS 24 by, in this example, program instructions or software instructions stored within the memory 77. As shown, these software instructions include, among other things, an operating system 79, a communication control module 81, a SIP/DIAMETER module 84, a CS authentication data module 86, and a subscriber profile module 88.

The communication control module 81 controls the communication between the HSS 24 and other network entities that are connected to the HSS 24 (e.g. the ICS IWF 22, the AS 26, and the CSCF 28).

The SIP/DIAMETER module 84 is responsible for handling (generating, sending, and receiving) signalling messages formatted in accordance with the Session Initiation and/or the DIAMETER protocol (if applicable). Such SIP/DIAMETER messages may relate to the retrieval, by the ICS IWF 22, of CS authentication parameters/subscriber profile associated with the mobile device 3, and to performing third party registration of the mobile device 3 in the home network 20.

The CS authentication data module 86 is responsible for handling (generating, storing, and providing to other nodes) data relating to CS authentication procedures, such as RAND and corresponding SRES values.

The subscriber profile module 88 stores subscriber profiles (and appropriate subscription parameters) associated with subscribers of the home network 20 (e.g. the subscriber of the mobile device 3). For each subscriber, the subscription profile includes, amongst others, an associated IMSI and an authentication key (e.g. Kc and/or the like) which may be used in authenticating the subscriber.

<CSCF>

FIG. 5 is a block diagram illustrating the main components of the CSCF 28 shown in FIG. 1. As shown, the CSCF 28 has a transceiver circuit 91, and a network interface 93 for transmitting signals to and for receiving signals from other network nodes (such as the ICS IWF 22). The CSCF 28 has a controller 95 to control the operation of the CSCF 28. The controller 95 is associated with a memory 97.

Software may be pre-installed in the memory 97 and/or may be downloaded via the telecommunication network 1 or from a removable data storage device (RMD), for example. The controller 95 is configured to control the overall operation of the CSCF 28 by, in this example, program instructions or software instructions stored within the memory 97. As shown, these software instructions include, among other things, an operating system 99, a communication control module 101, and a SIP/DIAMETER module 104.

The communication control module 101 controls the communication between the CSCF 28 and other network entities that are connected to the CSCF 28 (e.g. the ICS IWF 22, the HSS 24, the AS 26, and the CSCF 28).

The SIP/DIAMETER module 104 is responsible for handling (generating, sending, and receiving) signalling messages formatted in accordance with the Session Initiation and/or the DIAMETER protocol (if applicable). Such SIP/DIAMETER messages may relate to the retrieval of CS authentication parameters/subscriber profile associated with the mobile device 3, and to performing third party registration of the mobile device 3 in the home network 20.

In the above description, the MSC-S 12, the ICS IWF 22, the HSS 24, and the CSCF 28 are described for ease of understanding as having a number of discrete modules (such as the communications control modules, the network interworking modules, the SIP/DIAMETER modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

FIG. 6 is an exemplary timing diagram illustrating a method performed by components of the mobile telecommunication system 1 of FIG. 1 when the mobile device 3 is roaming into a non-ICS capable visited network 10.

As explained above, the mobile device 3 belongs to the ICS (IMS) enabled home network 20 and it is currently roaming in the non-ICS/non-IMS visited network 10, Accordingly, as generally shown in FIG. 6, the nodes of the visited network 10 are configured to communicate with each other using legacy CS protocols, whilst the nodes of the home network 20 are configured to communicate with each other using the SIP and/or DIAMETER protocol.

In this example, the mobile device 3 initiates a registration procedure with the visited network 10 by generating and sending, in step S601, an appropriately formatted request (e.g. a 'Location Update Request') to the MSC-S 12. The mobile device 3 includes in this message its associated International Mobile Subscriber Identifier (IMSI) and a Location Area Identifier (LAI) associated with the area (cell) where the mobile device 3 is currently located.

Based on the IMSI, the MSC-S 12 determines (using its roaming support module 45) that the mobile device 3 is a roaming UE and that it belongs to the home network 20. Accordingly, the MSC-S 12 needs to contact the HLR of the home network 20 for obtaining parameters (CS authentication data) for authenticating the mobile device 3. However, as the home network 20 is an ICS (IMS) network, there is no HLR provided.

Therefore, using its network interworking module 47, the MSC-S 12 generates and sends, in step S602, an appropriately formatted signalling message to the ICS IWF 22 (acting as the HLR of the home network 20), requesting the ICS IWF 22 to provide the necessary CS authentication parameters. The MSC-S 12 includes in its message (e.g. an 'Authentication Parameter Request' and/or the like) the IMSI associated with the mobile device 3.

In response to the request from the MSC-S 12, the ICS IWF 22 retrieves—either directly or indirectly—the necessary CS authentication data from the IBS 24 (as generally shown in step S603). It will be appreciated that the ICS IWF 22 may use e.g. DIAMETER signalling (when retrieving the CS authentication data from the HSS 24 directly) or SIP signalling (when retrieving the CS authentication data from the HSS 24 indirectly, e.g. via the CSCF 28). Further details of various options for the retrieval of CS authentication data will be described below with reference to FIGS. 7 to 9.

In this example, the HSS 24 returns the requested CS authentication data to the ICS IWF 22, including: the IMSI associated with the mobile device 3; an authentication key (e.g. Kc) associated with the mobile device 3; and a random number (RAND) with a corresponding response (SIZES). Therefore, the ICS IWF 22 generates (using its network interworking module 67) and sends, in step S604, an appropriately formatted signalling message (e.g. an 'Authentication Info' message) to the MSC-S 12, and includes in this message the CS authentication data from the HSS 24.

Using the received CS authentication data, the MSC-S 12 proceeds to carry out a CS authentication procedure with the mobile device 3. In order to do so, the MSC-S 12 generates (using its authentication module 43) and sends, to the mobile device 3 in step S605, an appropriately formatted authentication request including the received RAND value. The mobile device 3 computes an SRES from the received RAND and returns the RAND to the MSC-S 12, in step S606, in an appropriately formatted authentication response.

If the CS authentication procedure is successful (i.e. the MSC-S 12 determines that the mobile device 3 returned the correct SRES value for the RAND that was sent), the MSC-S 12 proceeds to step S607, in which it generates and sends an appropriately formatted message to the ICS IWF 22 (acting as the HLR of the home network 20) informing the home network 20 about the mobile device's 3 current location. As shown in FIG. 6, this message (e.g. an 'Update Location Request') includes the mobile device's 3 IMSI and MSRN.

In response to the location update request, the ICS IWF 22 proceeds to step S608, in which it retrieves from the HSS 24 (using their associated SIP/DIAMETER modules 64 and 84), the subscription profile and service settings for the mobile device 3 and maps them into a corresponding CS profile with CS settings (as appropriate for the non-ICS visited network 10). Further details of various options for the retrieval of subscription profile/service settings will be described below with reference to FIGS. 7 to 9.

Once it has mapped the subscription profile/service settings for the mobile device 3 into a corresponding CS profile with CS settings, the ICS IWF 22 generates (using its network interworking module 67) and sends, in step S609, an appropriately formatted message for providing the subscriber data (CS profile with CS settings) associated with the mobile device 3 to the MSC-S 12. This message, e.g. an 'Insert Subscriber Data' message, identifies the mobile device 3 by its IMSI and conforms to conventional VLR-HLR procedures (albeit the ICS IWF 22 being configured as the HLR of the home network 20 in this example). Thus, beneficially, the home network 20 is able to provide the necessary subscriber data to the visited network 10 even without an HLR in place and without supporting legacy CS protocols. Moreover, even though the visited network 10 supports such legacy CS protocols.

As generally shown in step S610, the MSC-S 12 starts ciphering its communication with the mobile device 3, according to normal (CS) procedures. The MSC-S 12 also generates and sends, in step S611, a 'Location Update Accept' message to the mobile device 3 according to the normal procedures. Effectively, this message is a response to the message received at step S610 informing the mobile device 3 that the location update request has been accepted.

Next, the MSC-S 12 generates and sends a 'Subscriber Data Insert Acknowledgement' message to the ICS IWF 22 (to confirm the message received at step S609) and receives a 'Location Update Acknowledgement' from the ICS IWF 22 according to normal VLR-HLR procedures (the ICS IWF 22 being configured to act as the HLR of the home network 20).

If necessary, the ICS IWF 22 also performs a so-called 3rd party IMS registration with the home network 20 (as generally illustrated in step S613) in order to enable terminating session redirection for the mobile device 3 to the visited network 10.

<Operation—Using DIAMETER Protocol>

FIG. 7 is another exemplary timing diagram illustrating a method performed by components of the mobile telecommunication system 1 of FIG. 1 when the mobile device 3 is roaming inti a non-ICS capable visited network 10. In this example, the ICS IWF 22 and the HSS 24 are configured to communicate with each other directly, using the DIAMETER protocol.

The numbering of steps in FIG. 7 is similar to the numbering used in FIG. 6. Thus, unless specified otherwise, the steps shown in FIG. 7 correspond to their respective like numbered steps described above with reference to FIG. 6 (e.g. step S702 corresponds to step S602 etc.), The description of these steps is omitted herein for simplicity.

The process begins in step S702 (which may be triggered by the receipt of e.g. a Location Update Request from the mobile device 3), in which the MSC-S 12 requests the ICS IWF 22 to provide the necessary CS authentication parameters for authenticating the mobile device 3. In response to the request from the MSC-S 12, the ICS IWF 22 proceeds to step S703*a*.

In this example, the ICS IWF 22 acts as an application server. Therefore, the ICS IWF 22 generates (using its SIP/DIAMETER module 64) and sends an appropriately formatted DIAMETER message (e.g. a Cx Multimedia-Ruth-Request (MAR) command) tri the HSS 24 for requesting the authentication parameters associated with the mobile device 3. In response to this, the HSS 24 generates (using its SIP/DIAMETER module 84) and sends, in step S703*b*, an appropriately formatted DIAMETER response (e.g. a Cx Multimedia-Ruth-Answer (MAA) command) to the ICS IWF 22 and includes in this response the requested CS authentication parameters associated with the mobile device 3 (such as the IMSI, the authentication key (e.g. Kc), and the RAND-SRES pair).

Steps S704 and S707 correspond to steps S604 and S607, respectively.

In response to the location update request (S707), the ICS IWF 22 proceeds to step S708*a*, in which it generates (using its SIP/DIAMETER module 64) and sends an appropriately formatted DIAMETER message to the HSS 24 (e.g. a Cx Multimedia-Auth-Request (MAR), User-Data-Request (UDR), Server-Assignment-Request (SAR) command, and/or the like) requesting the subscription profile and service settings associated with the mobile device 3.

The HSS 24 responds to this request by generating (using its SIP/DIAMETER module 84) and sending, in step S708*b*, an appropriately formatted DIAMETER message to the ICS IWF 22 (e.g. a Cx Multimedia-Auth-Answer (MAA), User-Data-Answer (UDA), Server-Assignment-Answer (SAA) command, and/or the like) including the requested the subscription profile/service settings.

In step S708*c*, the ICS IWF 22 stores the subscription profile and service settings for the mobile device 3 and maps them into a corresponding CS profile with CS settings (as appropriate for the non-ICS visited network 10). The ICS IWF 22 then proceeds to step S709 (which generally corresponds to step S609) and receives an appropriate Subscriber Data Insert Acknowledgement from the MSC-S 12 (in step S712) before proceeding to step S713.

In this example, as generally shown in step S713, the ICS IWF 22 and the home network nodes (e.g. HSS 24 and CSCF 28) perform an appropriate IMS address discovery (using e.g. the SIP protocol) for registering the mobile device 3. As part of this step, the ICS IWF 22 may also perform a so-called 3rd party IMS registration with the home network 20 in order to enable terminating session redirection for the mobile device 3 to the visited network 10.

Next, the ICS IWF 22 generates and sends, in step S714, a 'Location Update Acknowledgement' to the MSC-S 12 according to normal VLR-HLR procedures (the ICS IWF 22 being configured to act as the HLR of the home network 20).

<Operation—Using SIP and DIAMETER Protocol>

FIG. 8 is yet another exemplary timing diagram illustrating a method performed by components of the mobile telecommunication system 1 of FIG. 1 when the mobile device 3 is roaming into a non-ICS capable visited network 10. In this example, the ICS IWF 22 and the HSS 24 are configured to communicate with each other indirectly, via the CSCF 28 (using the SIP protocol between the ICS IWF 22 and the CSCF 28, and using the DIAMETER protocol between the CSCF 28 and the HSS 24).

The numbering of steps in FIG. 8 is similar to the numbering used in FIG. 6 (unless specified otherwise). The description of the similar steps is therefore omitted herein for simplicity.

As can be seen, the process begins in step S802 (which may be triggered by the receipt of e.g. a Location Update Request from the mobile device 3), in which the MSC-S 12 requests the ICS IWF 22 to provide the necessary CS authentication parameters for authenticating the mobile device 3. In response to the request from the MSC-S 12, the ICS IWF 22 proceeds to step S803*a*, in which it performs an IMS address discovery with the MSC-S 12. During this IMS address discovery, the ICS IWF 22 determines the address of the appropriate CSCF 28 for the mobile device 3.

Therefore, in this example, the ICS IWF 22 generates (using its SIP/DIAMETER module 64) and sends, in step S803*b*, an appropriately formatted SIP message (e.g. Register message) to the CSCF 28 for registering the mobile device 3 with the home network 20. It will be appreciated that, although not shown, the SIP message may include information identifying the mobile device 3, e.g. an IMSI and/or the like. In response to this SIP message, the CSCF 28 generates (using its SIP/DIAMETER module 104) and sends, in step S803*c*, an appropriately formatted DIAMETER request (e.g. a Cx-Put request such as a MAR command and/or the like) to the HSS 24 in order to obtain the CS authentication parameters associated with the mobile device 3 from the HSS 24.

The HSS 24 looks up the requested CS authentication parameters and generates (using its SIP/DIAMETER module 84) and sends, in step S803*d*, an appropriately formatted DIAMETER response (e.g. a Cx-Pull/CX-Response, such as a MAA command) to the CSCF 28 and includes in this response the requested CS authentication parameters associated with the mobile device 3 (such as the IMSI, the authentication key (e.g. Kc), and the RAND-SRES pair).

However, before completing the requested registration, the CSCF 28 generates and sends, in step S803*e*, an appropriately formatted SIP message to the ICS IWF 22 (e.g. a '401 Unauthorised' message) indicating that the mobile device 3 needs to authenticate itself in order to be able to register with the home network 20. The CSCF 28 also includes in this message the CS authentication parameters associated with the mobile device 3 (that it has received from the HSS 24).

Accordingly, in this example, steps S803*a* to S803*e* correspond to step S603 of FIG. 6. Steps S804 and S807 correspond to steps S604 and S607, respectively.

After the MSC-S 12 has indicated (by sending the message at S807) that the mobile device 3 has successfully authenticated itself (e.g. as described above with reference to steps S605 and S606), the ICS IWF 22 generates (using its SIP/DIAMETER module 64) and sends, in step S808*a*, an appropriately formatted SIP message (e.g. another or an updated Register message) to the CSCF 28 for registering the mobile device 3 with the home network 20. This time, however, the ICS IWF 22 is configured to indicate to the CSCF 28 (e.g. by setting the so-called Authentication Complete flag to 'true') that the mobile device 3 has successfully authenticated itself.

In response to this SIP message, the CSCF 28 generates (using its SIP/DIAMETER module 104) and sends, in step S808*b*, an appropriately formatted DIAMETER request to the HSS 24 (e.g. a Cx-Put request such as a SAR command with the Authentication Complete flag set to 'true') in order to indicate to the HSS 24 that the mobile device 3 has successfully authenticated itself. The HSS 24 confirms receipt of this message by generating and sending, in step S808*c*, an appropriately formatted DIAMETER response to the CSCF 28 (e.g. a SAA command).

In step S808*d*, the CSCF 28 registers the mobile device 3 with the AS 26 as well, by generating and sending a SIP Register message to the AS. In response to this, the AS 26 proceeds to obtain, from the HSS 24, the subscriber profile and service settings associated with the mobile device 3, using appropriate DIAMETER messages (over the Sh interface provided between them). In this example, as generally illustrated in step S808*e*, the AS 26 requests the subscriber profile and service settings by sending a User-Data-Request (UDR) command to the HSS 24 and the HSS 24 returns the requested subscriber profile and service settings in a User-Data-Answer (UDA) command.

In step S808*f*, the AS 26 forwards the subscriber profile and service settings associated with the mobile device 3 to the ICS IWF 22 (via the CSCF 28) using appropriately formatted SIP signalling, e.g. a '200 OK' message.

In step S808*g*, the ICS IWF 22 stores the subscription profile and service settings for the mobile device 3 and maps them into a corresponding CS profile with CS settings (as appropriate for the non-ICS visited network 10).

Effectively, steps S808*a* to S808*g* correspond to step S608 of FIG. 6. The ICS IWF 22 then proceeds to step S809 (which generally corresponds to step S609 of FIG. 6) and receives an appropriate Subscriber Data Insert Acknowledgement from the MSC-S 12 (in step S812) before proceeding to step S813.

In this example, as generally shown in step S813, the ICS IWF 22 determines that IMS registration has been completed, therefore it sends, in step S814, a 'Location Update Acknowledgement' to the MSC-S 12 according to normal VLR-HLR procedures (the ICS IWF 22 being configured to act as the MR of the home network 20).

FIG. 9 is a modification of the timing diagram shown in FIG. 8. The numbering of steps in FIG. 9 is similar to the numbering used in FIG. 8 (unless specified otherwise). The description of similar steps is therefore omitted herein for simplicity.

Steps S902 to S903*d* correspond to step S802 to S803*d* of FIG. 8, respectively. However, in this example, prior to responding to the SIP Register request from the ICS IWF 22 (received in step S903*b*) the CSCF 28 is configured to obtain both: the necessary CS authentication parameters for authenticating the mobile device 3; and the subscription profile/service settings for the mobile device 3.

Steps 903*c* and 903*d* correspond to steps 803*c* and 803*d* of FIG. 8, respectively, and steps S903*e* to 903*g* correspond to steps 808*d* to 808*f* of FIG. 8, respectively. However, in this case, the mobile device 3 registers with the AS 26 (rather than the CSCF 28), and the SIP '200 OK' message from the AS 26 to the ICS IWF 22 includes the CS authentication parameters (rather than the subscription profile/service settings for the mobile device 3). Therefore, in this example, steps S903*a* to S903*g* correspond to step S603 of FIG. 6.

Steps S904 and S907 correspond to steps S604 and S607 of FIG. 6, respectively.

After the MSC-S 12 has indicated (by sending the message at S907) that the mobile device 3 has successfully authenticated itself (e.g. as described above with reference to steps S605 and S606 of FIG. 6), the ICS IWF 22 generates (using its SIP/DIAMETER module 64) and sends, in step S908*a*, an appropriately formatted SIP message (e.g. an Invite message) to the AS 26 (via the CSCF 28) in order to establish a session involving the AS 26. The ICS IWF 22 includes in this message information relating to the session to be established, e.g. Public Service Identities (PSI) routing information and/or a User Profile Request.

In response to this, in step S908*b*, the AS 26 forwards the subscriber profile and service settings associated with the mobile device 3 to the ICS IWF 22 (via the CSCF 28) using appropriately formatted SIP signalling, e.g. a '200 OK' message.

In step S908*c*, the ICS IWF 22 stores the subscription profile and service settings for the mobile device 3 and maps them into a corresponding CS profile with CS settings (as appropriate for the non-ICS visited network 10).

Effectively, steps S908*a* to S908*c* correspond to step S608 of FIG. 6. The ICS IWF 22 then proceeds to steps S909 to S914 which generally correspond to steps S809 to S814 of FIG. 8, respectively.

<Further Example Embodiments>

FIG. 10 illustrates call flow for setting up a terminating call towards the visited network 10 (for a roaming mobile device 3). It will be appreciated that in this case the SIP User Agent (UA) functionality and the mobile device 3 are located in different PLMNs. Specifically, the SIP UA functionality is either located in the ICS IWF 22 or in the ICS MSC Server (in the home network 20), depending on which entity registered the mobile device 3 with the home network 20 (IMS) as described above with reference to FIGS. 6 to 9. Furthermore, the ICS IWF 22 may be collocated with an ICS MSC Server (in the home network 20) for outbound roamers, in which case the ICS MSC Server is configured to register the mobile device 3.

In this example, a calling party wants to setup a session towards the outbound roaming mobile device 3 in a different PLMN. In accordance with one of the procedures described above with reference to FIGS. 6 to 9, the mobile device 3 has attached to the visited network 10 so that the ICS IWF 22 (or an ICS MSC Server) registered to the home network 20 (IMS) on behalf of the roaming mobile device.

Step S1000: The calling party sends a normal SIP INVITE to the outbound roaming mobile device 3, using its normal IP Multimedia Public Identity (IMPU) as the request Uniform Resource Identifier (URI). It will be appreciated that the request may come from a different PLMN and may traverse different IMS nodes not shown in FIG. 10.

Step S1001: The serving CSCF 28 recognizes that the outbound roaming mobile device 3 is IMS registered and routes the session towards the user agent residing in the ICS IWF 22 (Or the ICS MSC Server).

Step S1002: The ICS IWF 22/ICS MSC Server resolves the location of the mobile device 3 and sends a CS call setup message (e.g. an Initial Address Message (IAM)) towards the non-ICS MSC-S 12 in the visited network 10. The ICS IWF 22/ICS MSC Server knows the non-ICS MSC-S 12 in the visited network 10 from the LAU procedure (e.g. steps S601 to S611 of FIG. 6).

Step S1003: The non-ICS MSC-S 12 performs normal CS session setup including paging etc.

Step S1004: The mobile device 3 acknowledges the call.

Step S1005: The MSC-S 12 sends a CS call setup acknowledgement (e.g. an Answer Message (ANM)).

Step S1006: The ICS IWF 22/ICS MSC Server sends a 200 OK message to the serving CSCF 28.

Step S1007: The serving CSCF 28 routes the 200 OK message towards the calling party (e.g. via a proxy CSCF 28 and/or another IMS network).

Upon receipt of the 200 OK message, the calling party may establish media plane (using one or more appropriate media gateways in the home network 20 and the visited network 10) for communicating with the mobile device 3 in the visited network 10.

In the above example embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop/tablet computers, booklet computers, wireless routers, web browsers, e-book readers, etc. As those skilled in the art will appreciate, it is not essential that the above described system be used for mobile communications devices. The system can be used to improve a network having one or more fixed communication devices as well as or instead of the mobile communicating devices.

In the above example embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above example embodiments employed transceiver circuitry, at least some of the functionality of the transceiver circuitry can be performed by software.

<Modifications and Alternatives>

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the radio access technology is not limited to E-UTRA, and may comprise any suitable access technology in accordance with one or more of the following standards: LTE, UMTS, GPRS, WiFi, WiMAX, and/or the like.

It will be appreciated that the above description may be applicable to 3GPP mobile networks, using GSM, GPRS, UMTS, HSPA, LTE, LTE-A access, and/or the like. However, the above description is not limited to such networks and could be used in the same way for any other cellular or mobile network, e.g. CDM2000, Bluetooth, 802.11 variants, ZigBee etc., i.e. any access technologies and core network technologies, to which a CS capable mobile device (UE) can connect.

It will be appreciated that in some scenarios (e.g. in case of a combined attach, circuit switch fall back, and/or the like) the Location Update Request message (step S601) may be sent, to the MSC-S, by the MME (or by a serving GPRS support node 'SGSN') of the visited network. In this case, the MSC-S sends the Location Update Accept message (step S611) to the MME (or the SGSN) that sent the Location Update Request message. It will also be appreciated, the in case of a combined attach, the authentication steps may not need to be carried out. By "authentication steps" the whole procedure S602-S606 can be skipped, because the UE gets authenticated via the MME in NAS signalling and the MSC only needs to perform the location update procedure to retrieve the user profile and service settings.

The above described protocol options are considered to be DIAMETER, MAP, SIP, although it will be appreciated that any other suitable protocol may be used (such as HTTP, XCAP, RADIUS etc). The above description discusses ICS and MSC-S, although it may also be applicable to any kind of SoftSwitch with Media Gateway (not only MSC-S). The functional element ICS Interworking Function may be provided as a separate entity or it may be collocated with another entity (e.g. the MSC-Server, HSS, Interconnect Border Control Function (IBCF), CSCF, AS, Packet Data Network Gateway (PGW), etc).

The CS authentication data in the above examples is described to include the parameters SRES, Kc and RAND. However, it will be appreciated that other parameters may also be used (e.g. in addition to, or instead of, the parameters SRES. Kc and RAND).

It will be appreciated that the reference points that the ICS IWF uses to connect with other nodes (i.e. Ics1 to Ics6) may be based on the Rx, Cx, Sh, B (MSC-VLR), Mw, i2, ISC reference point, and/or the like. The ICS IWF may be implemented as an enhanced HLR, supporting a similar functionality but different protocols towards the MSC-S and/or other IMS core network nodes, e.g. DIAMETER, HTTP, and SIP etc.

Various other modifications will be apparent to those skilled in the art and will not be described in further detail here.

<LIST OF ABBREVIATIONS>

AS Application Server
AVP Attribute Value Pair
CCA Credit-Control-Answer
eNB Evolved NodeB
GPRS General Packet Radio Service
HLR Home Location Register
HPLMN Home Public Land Mobile Network
HSS Home Subscriber Server
IBCF interconnection Border Control Function
ICS IMS Centralized Services
iFC Initial Filter Criteria
IMS IP Multimedia Subsystem
IMSI International Mobile Subscriber Identifier IP Internet Protocol
IWF Interworking Function
LAI Location Area Identifier
LAU Location Area Update
LTE Long Term Evolution
MAA Multimedia-Auth-Answer
MAP Mobile Application Part
MAR Multimedia-Auth-Request
MCC Mobile Country Code
MGW Media Gateway
MME Mobility Management Entity
MSC Mobile Switching Centre
MSC-S MSC-Server
MSRN Mobile Station Routing Number
NW Network
P-CSCF Proxy Call Session Control Function
PDN Packet Data Network
PGW PDN Gateway
QoS Quality of Service
RAND RANDom number (used for authentication)
RAR Re-Auth-Request
SAA Server-Assignment-Answer
SAR Server-Assignment-Request
S-CSCF Serving Call Session Control Function
SGSN Serving GPRS Support Node
SIP Session Initiation Protocol
SRES Signed RESponse (authentication value returned by the SIM or by the USIM in 2G AKA)
TAS Telephony Application Server
UDA User Data Answer
UDR User Data Request
UE User Equipment
URI Uniform Resource Identifier
URN Uniform Resource Name
VLR Visited Location Register
VPLMN Visited Public Land Mobile Network This application is based upon and claims the benefit of priority from European Patent application No. EP15193970.9, filed on Nov. 10, 2015; the disclosure of which is incorporated herein in its entirety by reference.

The invention claimed is:

1. A network node for IP Multimedia Subsystem (IMS) Centralized Services (ICS), comprising:
a memory storing instructions; and
at least one processor configured to process the instructions to:
  receive an Update Location Request including an IMSI (International Mobile Subscriber Identity) from an MSC (Mobile Switching Centre) Server,
  retrieve an IMS subscription profile and service settings from an HSS (Home Subscriber Server), based on the IMSI,
  map the IMS subscription profile with service settings into a CS (Circuit-Switched) profile with CS settings, and
  send an Insert Subscriber Data message including the mapped CS profile and CS settings, to the MSC Server.

2. The network node according to claim 1, wherein the at least one processor is further configured to process the instructions to:
  receive an Authentication Parameter Request indicating that CS authentication is required, from the MSC Server,
  retrieve CS authentication data from the HSS, and
  provide an Authentication Information message including the CS authentication data to the MSC Server.

3. A system comprising the network node according to claim 1; and a network node for outbound roaming support, comprising:
a memory storing instructions; and
at least one processor configured to process the instructions to;
  receive a Location Update Request message of a UE including an IMSI (International Mobile Subscriber Identity) and a Location Area Identifier (LAI),
  detect based on the IMSI that the UE does not belong to a network including the network node and is an inbound roamer,
  send to an IP Multimedia Subsystem (IMS) Centralized Services (ICS) Interworking Function (ICS-IWF), information indicating that CS authentication is required with an Authentication Parameter Request,
  receive an Authentication Information message including CS authentication parameters from the ICS-IWF,
  send an Update Location Request including the IMSI to the ICS-IWF, and
  receive an Insert Subscriber Data message including a mapped CS (Circuit-Switched) profile and CS settings, from the ICS-IWF,
  wherein the mapped CS profile and CS settings are retrieved based on the IMSI.

4. A network node for outbound roaming support, comprising:
a memory storing instructions; and
at least one processor configured to process the instructions to;
  receive a Location Update Request message of a UE including an IMSI (International Mobile Subscriber Identity) and a Location Area Identifier (LAI),
  detect based on the IMSI that the UE does not belong to a network including the network node and is an inbound roamer,
  send to an IP Multimedia Subsystem (IMS) Centralized Services (ICS) Interworking Function (ICS-IWF), information indicating that CS authentication is required with an Authentication Parameter Request,
  receive an Authentication information message including CS authentication parameters from the ICS-IWF,
  send an Update Location Request includinq the IMSI to the ICS-IWF, and
  receive an Insert Subscriber Data message including a mapped CS (Circuit-Switched) profile and CS settings, from the ICS-IWF,
  wherein the mapped CS profile and CS settings are retrieved based on the IMSI.

5. The network node according to claim 4, wherein the at least one processor is further configured to process the instructions to:
  send an Authentication Request with a RAND (random) value to the UE, and
  receive an Authentication Response including a SRES (signed response) computed by the UE based on the RAND value.

6. A communication method used in a network node for IP Multimedia Subsystem (IMS) Centralized Services (ICS), comprising:
  receiving an Update Location Request includinq an IMSI (International Mobile Subscriber Identity) from a MSC (Mobile Switching Centre) Server;
  retrieving an IMS subscription profile and service settings from a HSS (Home Subscriber Server), based on the IMSI;

mapping the IMS subscription profile with service settings into a CS (Circuit-Switched) profile with CS settings; and sending an Insert Subscriber Data message including the mapped CS profile and CS settings, to the MSC Server.

7. The communication method according to claim 6, further comprising:

receiving an Authentication Parameter Request indicating that CS authentication is required, from the MSC Server, retrieving CS authentication data from the HSS, and providing an Authentication Information message including the CS authentication data to the MSC Server.

8. A non-transitory computer readable recoding medium for storing a computer program comprising computer implementable instructions for causing a programmable communications device to perform the method of claim 6.

9. A communication method used in a network node for outbound roaming support, comprising:

receiving a Location Update Request message of a UE including an IMSI (International Mobile Subscriber Identity) and a Location Area Identifier (LAI);

detecting based on the IMSI that the UE does not belong to a network including the network node and is an inbound roamer;

sending to an IP Multimedia Subsystem (IMS) Centralized Services (ICS) Interworking Function (ICS-IWF), information indicating that CS authentication is required with an Authentication Parameter Request;

receiving an Authentication Information message including CS authentication parameters from the ICS-IWF;

sending an Update Location Request including the IMSI to the ICS-IWF; and receiving an Insert Subscriber Data message including a mapped CS (Circuit-Switched) profile and CS settings, from the ICS-IWF, wherein mapped CS profile and CS settings are retrieved based on the IMSI.

10. The communication method according to claim 9, further comprising:

sending an Authentication Request with a RAND (random) value to the UE, and receiving an Authentication Response including a SRES (signed response) computed by the UE based on the RAND value.

11. A non-transitory computer readable recoding medium for storing a computer program comprising computer implementable instructions for causing a programmable communications device to perform the method of claim 9.

\* \* \* \* \*